United States Patent Office 3,275,666
Patented Sept. 27, 1966

3,275,666
16-METHYLENE STEROIDS OF THE ESTRENE SERIES
Cornelis Maurits Siegmann, Oss, Netherlands, assignor to Organon Inc., West Orange, N.J., a corporation of New Jersey
No Drawing. Filed Mar. 5, 1964, Ser. No. 349,744
Claims priority, application Netherlands, Mar. 13, 1963, 290,170
4 Claims. (Cl. 260—397.5)

The invention relates to a group of new 16-methylene steroids and to a process for the preparation thereof.

More particularly, the invention relates to new 16-methylene steroids of the oestrene series.

In particular, the invention relates to new steroids of the formula:

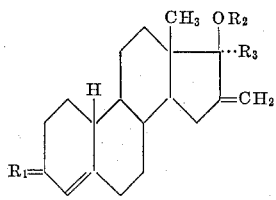

in which
$R_1 = H_2$ or $O$,
$R_2 = H$ or an acyl group,
$R_3 = H$ or a saturated or unsaturated alkyl group with 1–4 carbon atoms.

The compounds of the present invention possess valuable biological activities. They exert progestational, ovulation-inhibiting, anabolic and androgenic activities.

The above compounds may be prepared starting from a compound of the general formula:

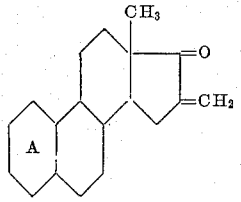

in which ring A has one of the following configurations:

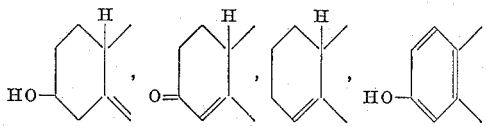

or

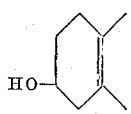

and in which the 3-substituent, if present, in the starting products may be temporarily protected.

According to the process of the present invention the starting product is converted by a known method into a $\Delta^4$-3-keto-, or $\Delta^4$-3-desoxo- steroid, if necessary, and the substituents in 17-position are introduced by reduction of the 17-keto group or by an alkylation reaction, followed, if desired, by esterification of the 17-hydroxyl group, in which the reaction steps may be performed in any order.

The starting products can be prepared by conversion of the relative 17-keto steroid by a Mannich reaction with formaldehyde and a secondary amine, e.g. dimethylamine or morpholine into the corresponding 16-methylamine-17-keto steroid, followed by the conversion of this compound into the desired 16-methylene-17-keto steroid in a known manner, e.g. by steam distillation or treatment with silica gel.

The alkyl group to be introduced into the 17-position is a saturated or unsaturated aliphatic hydrocarbon radical with 1–4 carbon atoms. As examples are mentioned: a methyl, ethyl, propyl, isopropyl, butyl, vinyl, propenyl, allyl, methallyl, ethinyl propinyl or butinyl group.

The said alkylation reaction may be performed by adding a metal derivative of a saturated or unsaturated hydrocarbon to the 17-keto group of the relative 16-methylene-17-keto steroid. The metal derivative may be a magnesium halide e.g., the magnesium bromide of the relative hydrocarbon.

The preparation of the 17-hydroxy-17-alkinyl compounds may also be performed by an addition reaction between the relative 17-keto steroid and a triple unsaturated hydrocarbon in the presence of an alkali metal or an alkali metal compound, such as an alkali metal alcoholate, or by the addition of a metal compound of a triple unsaturated hydrocarbon to the 17-keto group of the starting product. This metal compound may be an alkali metal or an alkaline earth metal compound.

For the preparation of a 17-saturated alkyl compound, too, a metal derivative of a saturated hydrocarbon can be used, for preference an alkali metal derivative, such as methyllithium or ethyllithium.

Finally the desired 17-hydroxy-17-alkenyl or 17-alkyl compounds may also be prepared by partial or complete reduction of the corresponding 17-hydroxy-17-alkinyl compounds. This reduction is usually performed with hydrogen in the presence of a catalyst, such as palladium or nickel.

If in this alkylation reaction a $\Delta^4$-3-desoxo-16-methylene-19-nor-androstene compound or a $\Delta^4$-3-keto-16-methylene-19-nor-androstene compound is taken as starting material a compound according to the invention is obtained direct. It is also possible to start from a $\Delta^4$-3-keto-16-methylene-19-nor-androstene compound, the 3-keto group of which is temporarily protected by an enolester or an enolether grouping. After the desired conversion this protected group is split off again by treatment with an acid.

If desired, the resulting $\Delta^4$-3-keto compound may be converted into the corresponding 3-desoxo compound by splitting off the 3-keto group. This splitting off may be performed by thioketalisation, followed by the reductive splitting off of the resulting 3-thioketal compound, e.g., by treatment with an alkali metal in liquid ammonia.

As starting products in the alkylation reaction may also be used $\Delta^5$-3-hydroxy-19-nor-androstene compounds, $\Delta^{1,3,5(10)}$-3-hydroxy-oestratriene compounds, or functional derivatives thereof, such as 3-esters or 3-ethers.

After alkylation in the 17-position the first-mentioned group of compounds is converted in a known manner into the desired $\Delta^4$-3-(des)oxo-19-nor-androstene compounds. The $\Delta^4$-3-keto compound is prepared by oxidation of the $\Delta^5$-3-hydroxy compound, e.g. by an Oppenauer oxidation.

A preferential method for the preparation of the desired $\Delta^4$-3-keto-16-methylene-oestrene compounds consists in starting from a $\Delta^5$-3-hydroxy-16-methylene-17-keto-oestrene, the 3-hydroxyl group of which may be temporarily protected, introducing the indicated substituents in 17-position by reduction of the 17-keto group or by an alkylation reaction, followed, if desired, by esterification of the 17-hydroxyl group, and converting the $\Delta^5$-3-hydroxy group in a $\Delta^4$-3-keto group by oxidation, in which the reaction steps may be performed in any order.

For the preparation of the desired $\Delta^4$-3-desoxo-16-methylene-oestrene compounds it is preferred to start from $\Delta^4$-3-desoxo-16-methylene-17-keto-oestrene.

The 16 - methylene-17-hydroxy-(17-alkyl) steroids obtained by the methods described above may be esterified at the 17-hydroxyl group, if desired. In the esterification a saturated or unsaturated organic carboxylic acid with 1–18 carbon atoms is preferably applied.

As examples of acids to be used are mentioned, acetic acid, propionic acid, valeric acid, oenanthic acid, caprylic acid, capric acid, lauric acid, decylenic acid, undecylenic acid, benzoic acid, cyclohexyl butyric acid, phenylpropionic acid, palmitic acid, stearic acid, succinic acid or malonic acid.

The esterification may be performed in a known manner by reaction of the 17-hydroxy compound with the relative acid or a derivative thereof, such as the anhydride or a halide, e.g., the acid chloride.

The invention is illustrated further by the following examples:

Example I

To a solution of 10.0 gm. of 17-keto-$\Delta^4$-oestrene in 140 ml. of glycolmonomethyl ether were added 3.6 gm. of paraformaldehyde and 12 gm. of dimethylamine·HCl. The reaction mixture was refluxed for 6 hours in nitrogen atmosphere, during which process the same amounts of paraformaldehyde and dimethylamine·HCl were added again after the lapse of 3 hours. The reaction mixture was poured out into water and the aqueous mixture extracted with chloroform. The extract was washed with water, dried on anhydrous sodium sulphate and evaporated to dryness. The residue weighed about 3 gm.

This residue was taken up in 40 ml. of methanol and 100 ml. of a solution of 10% $Na_2CO_3$. This mixture was extracted with ether and the solution in ether washed thoroughly with water, dried on anhydrous sodium sulphate and evaporated to dryness. The residue weighed 11.8 gm.

To a solution of this residue in 150 ml. of alcohol were added 45 gm. of $SiO_2$ and this mixture was stirred overnight at room temperature in nitrogen atmosphere. The $SiO_2$ was separated by filtration and washed with a mixture of alcohol and methylene chloride. The filtrate was poured out into water and the aqueous mixture extracted with methylene chloride. The extract was washed with water, dried on anhydrous $Na_2SO_4$ and evaporated to dryness. The residue weighed 10.0 gm. A solution of this residue in benzene was filtered over 100 gm. of $SiO_2$ to obtain a residue of 8.2 gm. Crystallisation from ether-methanol yielded 6.5 gm. of 17-keto-16-methylene-$\Delta^4$-oestrene; melting point 80–82° C.

To 1.7 gm. of lithium in 70 ml. of absolute ether was added 0.7 ml. of methyl iodide. This mixture was heated to start the reaction, whereup 70 ml. of ether were added. Next a mixture of 7 ml. of methyl iodide and 50 ml. of absolute ether were added dropwise at such a temperature that the mixture kept boiling gently. Next the reaction mixture was refluxed for 1 hour and after that cooled and filtered in nitrogen atmosphere.

This filtrate was added dropwise, at 5° C., to a solution of 5.0 gm. of 17-keto-16-methylene-$\Delta^4$-oestrene in 250 ml. of absolute ether. The reaction mixture was stirred for 3 hours at room temperature in nitrogen atmosphere and next poured out into ice water containing 2 N $H_2SO_4$. The aqueous mixture was extracted with ether and the extract washed with water, dried on anhydrous $Na_2SO_4$ and evaporated to dryness. The residue weighed 5.45 gm.

A solution of this residue in benzene-ether (9:1) was filtered over 55 gm. of $SiO_2$ to obtain a residue of 5.10 gm. Crystallization from ether-petroleum ether yielded 2.70 gm. of 17$\beta$-hydroxy-16-methylene-17$\alpha$-methyl-$\Delta^4$-oestrene; melting point: 73–75° C.; rotation: $[\alpha]_D = -41°$ (chloroform).

To a solution of 2.1 g. of $\Delta^4$-16-methylene-17$\beta$-hydroxy-17$\alpha$-methyl-oestrene in 15 ml. of pyridine 3.9 g. of acetic acid anhydride are added. The solution is stirred at 35° C. for 8 hours, after which 25 ml. of water are added. The mixture is then stirred for 2 hours and next after adding 100 ml. of water, extracted with ether. The ether-extract is washed with 2 N hydrochloric acid, after that with 1 N sodium hydroxide, subsequently dried with sodium sulphate and finally evaporated to dryness. The residue is recrystallised from methanol, after which the 17-acetate of $\Delta^4$-16-methylene-17$\beta$-hydroxy-17$\alpha$-methyl-oestrene is obtained.

In the same way the 17-butyrate, 17-caproate, succinate and $\beta$-phenylpropionate are prepared by replacing the acetic anhydride by an equivalent quantity of the acid anhydride in question.

To a solution of 1.15 g. of $\Delta^4$-16-methylene-17$\beta$-hydroxy-17$\alpha$-methyl-oestrene in 10 ml. of pyridine 2 ml. of capric chloride is added while stirring. The reaction mixture is left overnight at room temperature, then 20 ml. of water are added and the solution is stirred for 2 hours. After adding 100 ml. of water the mixture is extracted with ether. The ether extract is washed with 2 N hydrochloric acid, after that with 1 N sodium hydroxide, then dried with sodium sulphate and finally evaporated to dryness. The residue obtained is taken up in benzene-petroleum-ether and then filtered over 40 g. of aluminium oxide. The eluate is evaporated to dryness and the drying residue recrystallised from methanol to obtain the 17-caprinate of $\Delta^4$-16-methylene-17$\beta$-hydroxy-17$\alpha$-methyl-oestrene.

Analogously the 17-oenanthate, 17-laurate, 17-palmitate and 17-stearate are prepared.

Example II

A mixture of 19 ml. of ethylbromide and 90 ml. of absolute tetrahydrofuran was added dropwise, while bubbling through nitrogen, to 6 gm. of Mg in 90 ml. of absolute tetrahydrofuran at such a rate that the reaction mixture kept boiling gently. The reaction mixture was refluxed for 1 hour and next added in small portions to 100 ml. of absolute tetrahydrofuran saturated with acetylene while bubbling through acetylene at room temperature. After the addition of the reaction mixture the bubbling through of acetylene was continued for 30 minutes.

To the above reaction mixture a solution was added dropwise to 5.0 gm. of 17-keto-16-methylene-$\Delta^4$-oestrene in 100 ml. of absolute tetrahydrofuran. Next the reaction mixture was stirred overnight at room temperature.

The reaction mixture was poured into ice water saturated with $NH_4Cl$ and after that processed in the normal manner to obtain a residue of 5.9 gm.

A solution of this residue in benzene was filtered over 60 gm. of $SiO_2$ to obtain a residue of 2.5 gm. Crystallization for ether-petroleumether yielded 1.5 gm. of 17$\beta$-hydroxy-16-methylene-17$\alpha$-ethinyl-$\Delta^4$-oestrene; melting point: 155–160° C.

By esterification of this compound in the manner described in Example I 17-esters are obtained derived from acetic acid, valeric acid, caprylic acid and oleic acid.

Example III 1.4 ml. of methyl iodide were added to a mixture of 3.4 g. of Li and 140 ml. of absolute ether. This mixture was warmed up until the reaction started. The heating bath was removed and 140 ml. of ether were added. A mixture of 14 ml. of methyl iodide and 100 ml. of absolute ether was added slowly; the reaction mixture was kept boiling during this addition. After refluxing for one hour the reaction mixture was cooled and filtered over cotton wool under $N_2$. At 5° C. this filtrate was added dropwise to a solution of 10.0 g. of 3-methoxy-17-keto-16-methylene-$\Delta^{1,3,5(10)}$-oestratriene in 500 ml. of absolute tetrahydrofuran. This reaction mixture was stirred under $N_2$ at room temperature for three hours and then poured into ice-water which contained 100 ml. of 2 N $H_2SO_4$. Working up by extraction gave a residue of 10.8 g. Crystallisation from acetone yielded 7.2 g. of $\Delta^{1,3,5(10)}$-3-methoxy - 16 - methylene - 17$\beta$ - hydroxy - 17$\alpha$ - methyl-oestratriene; M.P.: 62–65° C.; rotation: $[\alpha]_D = -6°$ (chf.).

A solution of 9.0 gm. of 3-methoxy-17β-hydroxy-16-methylene-17α-methyl-$\Delta^{1,3,5(10)}$-oestratriene in 900 ml. of absolute tetrahydrofuran was added dropwise to 2.7 ml. of liquid $NH_3$. At —40° C. 9 gm. of Li were added to this solution in small portions. After stirring at the same temperature for 3 hours 90 ml. of absolute alcohol were gently added dropwise. After evaporation of the liquid $NH_3$ the reaction mixture was poured into water and processed in the normal manner to obtain a residue of 9.0 gm.

This residue was dissolved in 540 ml. of methanol, whereupon 300 ml. of 3 N HCl were added to this solution. After refluxing for 20 minutes the reaction mixture was processed. Crystallisation from acetone ether yielded 6.2 gm. of 3-keto-17β-hydroxy-16-methylene-17α-methyl-$\Delta^4$-oestrene.

In the same manner 3-ethoxy-17-keto-16-methylene-$\Delta^{1,3,5(10)}$-oestratriene has been converted into the corresponding 17β-hydroxy-17α-propyl-, and 17β-hydroxy-17α-butenyl compounds by reacting the above 16-methylene-17-ketosteroid respectively with propyl magnesium bromide and butenyl magnesium chloride, followed by reduction with sodium in liquid ammonia and treatment with hydrochloric acid.

By esterification of these compounds in the manner as described in Example I the 17β-hydroxy-17α-methyl-compound has been converted into the 17-esters derived from acetic acid, valeric acid and β-phenylpropionic acid, the 17β-hydroxy-17α-propyl compound into the 17-esters derived from oenanthic acid and lauric acid and the 17β-hydroxy-17α-butenyl compound into the 17-esters dedived from acetic acid, capric acid and β-phenylpropionic acid.

Example IV

A solution of 1 gm. of $NaBH_4$ in 3 ml. of water was added to a solution of 5 g. of 17-keto-16-methylene-$\Delta^4$-oestrene in 150 ml. of methanol. The reaction mixture was left to stand for 1 hour at room temperature and next processed. The residue of 5.10 gm. was dissolved in benzene and this solution filtered over 25 gm. of $SiO_2$. By crystallisation from ether 3.25 gm. of 17β-hydroxy-16-methylene-$\Delta^4$-oestrene was obtained from the residue; melting point 103–106° C.

Example V

A solution of 1.00 gm. of 17β-hydroxy-16-methylene-$\Delta^4$-oestrene in 10 ml. of phenylpropionic acid anhydride was heated at 120° C. for 3 hours. After processing a residue was obtained of 2.44 gm.

On eluating with benzene-ether (19:1) chromatography over 100 gm. of $SiO_2$ yielded a fraction of 1.00 g. from which 0.80 gm. of 17β-hydroxy-16-methylene-$\Delta^4$-oestrene-17β-phenylpropionate was obtained by crystallisation from etherpetroleumether.

Example VI

A solution of 5.00 gm. of 3β-hydroxy-17-keto-16-methylene-$\Delta^{5(10)}$-oestrene in 250 ml. of absolute ether was added dropwise to 150 ml. of a solution of ethyllithium, prepared from 1.7 gm. of Li and 10 ml. of ethylbromide, in ether. The reaction mixture was stirred for 3 hours at room temperature and next processed in the normal manner to obtain a residue of 5.50 gm.

At 10° C. 5.5 ml. of a solution of 8 N $CrO_3$ (Jones reagent) were added dropwise to a solution of this residue in 550 ml. of acetone. After stirring for another 10 minuets at this temperature the reaction mixture was processed in the normal manner. The residue weighed 5.30 gm.

This residue was dissolved in 330 ml. of methanol to which 175 ml. of 3 N HCl had been added. After refluxing for 20 minutes the residue mixture was processed. Crystallisation from acetone-ether yielded 2.50 gm. of 3-keto-17β-hydroxy-17α-ethyl-16-methylene-$\Delta^4$-oestrene.

To a solution of 2.50 gm. of 3-keto-17β-hydroxy-17α-ethyl-16-methylene-$\Delta^4$-oestrene in 60 ml. of glacial acetic acid were added, at 0° C., 1.8 ml. of ethane dithiol and 1.5 ml. of $BF_3$-ethereate. After standing at room temperature for 2 hours, the reaction mixture was processed to obtain a residue of 3.10 gm.

A solution of this residue in 15 ml. of absolute tetrahydrofuran was added dropwise, at —50° C., to a suspension of 1.6 gm. of Na in 100 ml. of liquid $NH_3$. After stirring for 10 minutes at room temperature 15 ml. of absolute alcohol were gently added dropwise to remove the excess of Na. Evaporation of the liquid $NH_3$, pouring into water and processing yielded a residue of 2.50 gm. Crystallisation from ether yielded 1.50 gm. of 17β-hydroxy-16-methylene-17α-ethyl-$\Delta^4$-oestrene.

Example VII

In the same manner as described in the last part of Example VI $\Delta^4$-3-keto-16-methylene-17β-hydroxy-17α-propyl-oestrene and $\Delta^4$-3-keto-16-methylene-17β-hydroxy-17α-butenyl-oestrene have been converted into the corresponding 3-desoxo compounds.

Esterification of these compounds in the manner as described in Example I yielded the 17-esters derived from acetic acid, β-chloropropionic acid, succinic acid and β-phenylpropionic acid.

Example VIII

A solution of 5.00 gm. of 17-keto-16-methylene-$\Delta^4$-oestrene in 150 ml. of absolute tetrahydrofuran was added dropwise to 90 ml. of a solution of allylmagnesiumbromide (prepared from 4.5 g. of Mg and 7.5 ml. of allylbromide) in ether. The reaction mixture was stirred under $N_2$ at room temperature for four hours and then poured into ice-water which had been acidified with 2 N $H_2SO_4$. Working up by extraction gave a residue of 6.00 g. Crystallisation from petrolether yielded 3.6 g. of $\Delta^4$-16-methylene-17β-hydroxy-17α-allyl-oesterene; M.P.: 54–57° C.; rotation: $[\alpha]_D = -30°$ (chf.)

In the manner as described in Example I this compound has been converted into the 17-esters derived from acetic acid, caproic acid, lauric acid and β-phenylpropionic acid.

Example IX

A solution of 3.00 g. of 17-keto-16-methylene-$\Delta^4$-oestrene in 100 ml. of absolute tetrahydrofuran was added dropwise to 40 ml. of a solution of propargylmagnesiumbromide (prepared from 1 g. of Mg, 0.1 g. of $HgCl_2$ and 3.5 ml. of propargyl bromide) in ether. The reaction mixture was stirred under $N_2$ overnight at room temperature and then poured into ice-water which contained $NH_4Cl$. Working up by extraction gave a residue of 3.53 g. Crystallisation from ether yielded 2.30 g. of $\Delta^4$-16-methylene-17β-hydroxy-17α-propargyl-oestrene; M.P.: 139–141° C.; rotation: $[\alpha]_D = -36°$ (chf.).

According to the methods as described in Example I the above compound has been converted into the 17-acetate, 17-valerianate and 17β-phenylpropionate.

Example X

To a solution of 10.0 gm. of $\Delta^{5(6)}$-3β-hydroxy-17-keto-oestrene in 100 ml. of ethyleneglycol monomethylether were added 5.0 gm. of paraformaldehyde and 20.0 gm. of dimethylamine·HCl. The reaction mixture was refluxed for 2 hours and poured out into a 10% sodium carbonate solution in water and subsequently worked up as described in Example I. The thus obtained residue was filtered over 200 gm. of $SiO_2$ in benzene/ether (9:1) to obtain $\Delta^{5(6)}$-3β-hydroxy-16-methylene-17-keto-oestrene; melting point: 192–196° C.; rotation: $[\alpha]_D = +16°$ ($CHCl_3$).

In the manner as described in Example I this compound was converted into the corresponding 17β-hydroxy-17α-methyl-compound by means of methyllithium; melting point: 174–177° C.

10.0 gm. of this compound were dissolved in 1 liter of toluene and 100 ml. of cyclohexanone, 100 ml. of the solvent was distilled off and subsequently a solution of 10.0 gm. of aluminium isopropylate in 200 ml. of toluene was added. The reaction mixture was refluxed for 2 hours. After steam distillation the mixture was poured out into water and extracted with a mixture of methylene chloride and tetrahydrofuran (3:1). The thus obtained residue was chromatographed over 200 gm. of $SiO_2$ in benzene/ether (9:1) to yield 7.1 gm. of $\Delta^4$-3-keto-16-methylene-17$\beta$-hydroxy-17$\alpha$-methyl - oestrene: melting point is 163–165° C.; rotation: $[\alpha]_D = -58°$ ($CHCl_3$).

*Example XI*

To a mixture of 12.0 gm. of Mg in 175 ml. of tetrahydrofuran was added in $N_2$-atmosphere a solution of 38.0 ml. of ethylmagnesiumbromide in 175 ml. of tetrahydrofuran and afterwards refluxed for 30 minutes. The thus obtained ethylmagnesiumbromide solution was added to 200 ml. of tetrahydrofuran saturated with acetylene while bubbling through acetylene. To the above reaction mixture a solution of 10.0 gm. of $\Delta^{5(6)}$-3$\beta$-hydroxy-16-methylene-17-keto-oestrene in 200 ml. of tetrahydrofuran was added. The mixture was worked up as described in Example II to yield $\Delta^{5(6)}$-3$\beta$,17$\beta$-dihydroxy-16-methylene-17$\alpha$-ethinyl-oestrene.

Oxidation of this product in the manner as described in Example X yielded $\Delta^4$-3-keto-16-methylene-17$\beta$-hydroxy-17$\alpha$-ethinyl-oestrene with a melting point of 195–197° C.; rotation: $[\alpha]_D = -11°$ ($CHCl_3$).

Esterification of this compound in the manner as described in Example I yielded the 17-esters derived from acetic acid, decanoic acid, palmitic acid and $\beta$-phenylpropionic acid.

I claim:
1. Steroids of the formula:

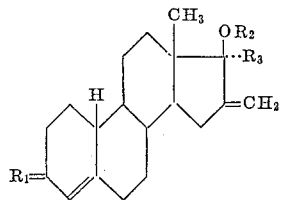

wherein
$R_1$ is selected from the group consisting of $H_2$ and O,
$R_2$ is selected from the group consisting of hydrogen and acyl derived from an organic hydrocarbon carboxylic acid having 1–18 carbon atoms,
$R_3$ is selected from the group consisting of hydrogen, a saturated and an unsaturated aliphatic hydrocarbon with 1–4 carbon atoms.

2. Steroids of the formula:

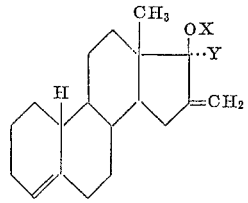

wherein
X is selected from the group consisting of hydrogen and acyl derived from an organic hydrocarbon carboxylic acid having 1–18 carbon atoms, and
Y is selected from the group consisting of a saturated and an unsaturated aliphatic hydrocarbon with 1–4 carbon atoms.

3. A compound selected from the group consisting of $\Delta^4$-16-methylene-17$\beta$-hydroxy-17$\alpha$-allyl-oestrene and 17-organic hydrocarbon carboxylic acid esters thereof derived from carboxylic acids having 1–18 carbon atoms.

4. A compound selected from the group consisting of $\Delta^4$-16-methylene-17$\beta$-hydroxy-17$\alpha$-propargyl-oestrene and 17-organic hydrocarbon carboxylic acid esters thereof derived from carboxylic acids having 1–18 carbon atoms.

References Cited by the Examiner

UNITED STATES PATENTS 3,112,328  11/1963  Szpilfogel et al. ____ 260—397.3
3,117,060  1/1964   Bruckner et al. _____ 167—74

LEWIS GOTTS, *Primary Examiner.*

ELBERT L. ROBERTS, *Examiner.*